United States Patent
Farooq

(10) Patent No.: US 6,211,304 B1
(45) Date of Patent: *Apr. 3, 2001

(54) MORDANTS FOR INK-JET RECEPTORS AND THE LIKE

(75) Inventor: Omar Farooq, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 08/521,545

(22) Filed: Aug. 30, 1995

Related U.S. Application Data

(63) Continuation-in-part of application No. 08/393,208, filed on Feb. 23, 1995, now abandoned.

(51) Int. Cl.$^7$ ............................. C07F 9/54; C07C 281/18; C08G 65/32
(52) U.S. Cl. .......................... 525/403; 525/409; 528/405; 564/15; 564/227
(58) Field of Search ..................... 564/227, 15; 528/405; 525/403, 409

(56) References Cited

U.S. PATENT DOCUMENTS

| | | | |
|---|---|---|---|
| 2,945,006 | 7/1960 | Minsk | 260/65 |
| 3,075,841 | 1/1963 | Lehman et al. | 96/77 |
| 3,271,148 | 9/1966 | Whitmore | 96/29 |
| 3,429,839 | 2/1969 | Franco | 260/8 |
| 3,488,706 | 1/1970 | Cohen et al. | 96/29 |
| 3,547,649 | 12/1970 | Franco | 96/114 |
| 3,624,229 | 11/1971 | Timmerman et al. | 96/84 |
| 4,379,838 | 4/1983 | Helling et al. | 430/518 |
| 4,450,224 | 5/1984 | Klein et al. | 430/213 |
| 4,500,631 | 2/1985 | Sakamoto et al. | 430/413 |
| 4,695,531 * | 9/1987 | Delfino | 430/513 |
| 4,814,255 | 3/1989 | Vanmaele et al. | 430/213 |
| 4,820,608 | 4/1989 | Claeys et al. | 430/213 |
| 4,855,211 | 8/1989 | Janssens et al. | 430/213 |
| 4,926,190 * | 5/1990 | Laver | 428/195 |
| 5,129,948 * | 7/1992 | Breton | 106/23 |
| 5,134,198 | 7/1992 | Stofko, Jr. et al. | 525/205 |
| 5,156,675 | 10/1992 | Breton et al. | 106/22 |
| 5,354,813 * | 10/1994 | Farooq | 525/326.7 |
| 5,403,955 * | 4/1995 | Farooq | 564/15 |

FOREIGN PATENT DOCUMENTS

| | | |
|---|---|---|
| 850281 | 10/1960 | (GB) . |
| 931270 | 10/1972 | (IT) . |
| 63-307979 | 12/1988 | (JP) . |

\* cited by examiner

Primary Examiner—Donald R. Wilson
(74) Attorney, Agent, or Firm—Darla P. Fonseca

(57) ABSTRACT

Novel mordants based upon a poly(alkylene oxide) backbone and either pendant phosphonium or quaternized-nitrogen compounds are disclosed. The mordants find use in stopping or controlling ink-bleeding in ink-jet receptors and photographic films.

7 Claims, No Drawings

MORDANTS FOR INK-JET RECEPTORS AND THE LIKE

This application is a continuation-in-part application of U.S. patent application Ser. No. 08/393,208, filed Feb. 23, 1995.

FIELD OF THE INVENTION

This invention relates to mordants for ink-jet receptors and the like and more particularly, it relates to various types of novel mordants based upon a poly(alkylene oxide) backbone.

BACKGROUND OF THE ART

Mordants, well-known in the photographic art, generally comprise materials containing quaternary ammonium groups as disclosed in U.S. Pat. Nos. 3,075,841; 3,271,148; 3,488,706; 4,379,838; and 4,814,255. Quaternary phosphonium groups have also been incorporated with certain polymer backbones to obtain different classes of mordants such as those disclosed in U.S. Pat. Nos. 3,547,649; 4,820,608; and 4,855,211; and 5,403,955.

The basic polymeric mordants useful to mordant a dye in a hydrophilic colloidal layer between a base and a photographic emulsion layer disclosed in U.S. Pat. No. 4,695,531 comprise repeating units of formula:

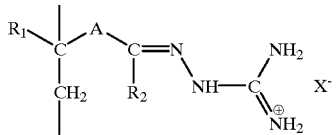

I wherein: $R_1$ is hydrogen or a methyl group; A is a —COO— or a —COO-alkylene group, e.g., —COOCH$_2$—, —COOCH$_2$CH$_2$—, —COOCHOHCH$_2$—; $R_2$ is a hydrogen or a lower alkyl group having from 1–4 carbon atoms; and $X^-$ is an anion, e.g., acetate, oxalate, sulfate, chloride, or bromide. Mordant I can comprise units derived from vinylic monomers, for example, acrylates, acrylamides, vinyl acetates, styrenes, vinyl ethers, vinyl ketones, vinyl alcohols, unsaturated chlorides, and nitriles with the proviso that such copolymerizable units be in a quantity of 10–20% by weight. Similar mordants with the exclusion of A in I are also disclosed in GB Patent No. 850,281.

U.S. Pat. No. 5,354,813 discloses several classes of polymeric mordants having a pendent heterocyclic aromatic moiety, e.g., a pyridyl or an imidazolyl group, as represented by the fomula II below:

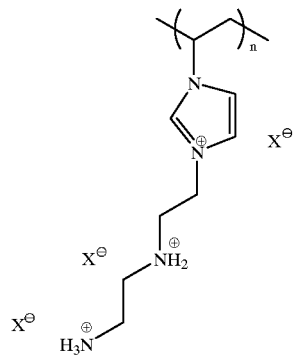

II wherein: $X^-$ represents an anion and n represents an integer of 2 or greater.

Mordants prepared by polymerizing or copolymerizing vinyl pyridine or N-alkyl pyridinium salts are also known in the art (see, for example, Italian Patent No. 931,270).

Non-diffusive mordants based on poly(N-vinylimidazole) of the type III are known in the art (see U.S. Pat. No. 4,500,631) and have been used in certain radiographic image-forming processes wherein the mordants were coupled with water-soluble dyes. Mordants of the type III as well as IV are also disclosed in Japanese Publn. No. 63-307979.

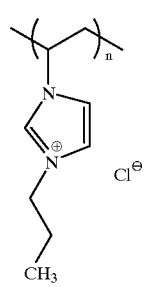

III

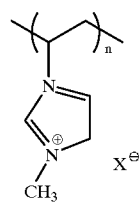

IV $X^- = I, p\text{-MePhSO}_3$

Other types of mordants for dyes are also known in the imaging arts. For example, U.S. Pat. No. 3,429,839 discloses mordants having pendant groups Y, such as the mordant of formula VI:

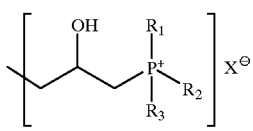

V

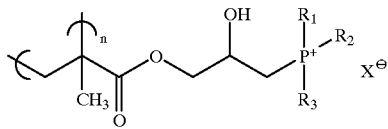

wherein: $R_1$, $R_2$, and $R_3$ are alkyl, aryl, or aralkyl groups, or any two of $R_1$, $R_2$, or $R_3$ are part of a 5- or 6-membered heterocyclic ring and $X^-$ is an anion, usually an anion of a mineral acid or a carboxylic acid having from 2 to 20 carbon atoms.

U.S. Pat. No. 3,547,649 discloses mordants of the following formulae:

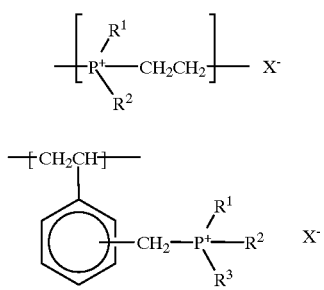

wherein: $R^1$, $R^2$, and $R^3$ are alkyl, aryl, or aralkyl groups or any two of $R_1$, $R_2$, or $R_3$ are part of a 5- or 6-membered heterocyclic ring and $X^-$ is an anion.

Because of the advent of ink-jet printers, there is a continued demand in the industry for mordants which will control or stop ink-bleeding in ink-jet receptors and the like. It was against this background that research for such novel mordants was conducted.

SUMMARY OF THE INVENTION

The present invention provides novel mordants for dyes and the like. In one embodiment, the inventive mordants are represented by the following general formula:

IX

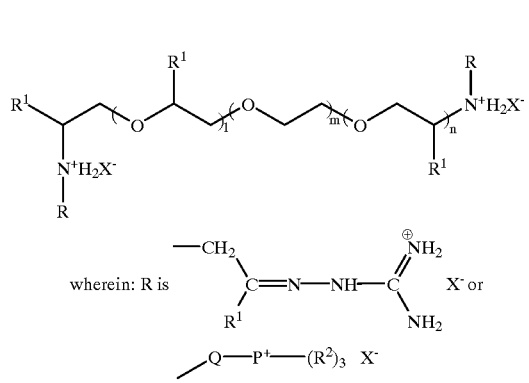

wherein $R^1$ is an alkyl group having 1 to 6 carbon atoms, preferably 1 to 2 carbon atoms and $R^2$ is an alkyl, aryl, aralkyl, or alkaryl group having up to 10 carbon atoms inclusive; preferably alkyl having up to 6 carbon atoms inclusive or phenyl; l and n are integers of 2 or greater, preferably 2–3, most preferably 3; m is an integer of 5 or greater, preferably 30–50, most preferably 40; and Q represents $-(CH_2)_y-$ wherein y is 1–20, preferably 3–4.

$X^-$ is independently an anion, preferably $CH_3SO_3^-$, $Br^-$, $NO_3^-$, $Cl^-$, $CF_3COO^-$,

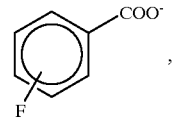

p-MePhSO$_3^-$, ClO$_4^-$, F$^-$, CF$_3$SO$_3^-$, BF$_4^-$, C$_4$F$_9$SO$_3^-$, FSO$_3^-$, PF$_6^-$, ClSO$_3^-$, or SbF$_6^-$.

In accordance with another embodiment of the present invention, there is provided a class of inventive mordants of the general formula:

X wherein: R, $R^1$, $R^2$, and $X^-$ are the same as in formula IX above and p is an integer greater than or equal to 2; preferably 16–26, most preferably 20.

The inventive mordants described above are believed to be novel and not to have been previously disclosed in the literature. The inventive mordants are useful in a variety of applications such as in ink-jet and photographic films.

As is well understood in this area, substitution is not only tolerated, but is often advisable. As a means of simplifying the discussion and recitation of certain terminology used throughout this application, the terms "group" and "moiety" are used to differentiate between chemical species that allow for substitution or which may be substituted and those which do not so allow or may not be so substituted. Thus, when the term "group" is used to describe a chemical substituent, the described chemical material includes the basic group and that group with conventional substitution. Where the term "moiety" is used to describe a chemical compound or substituent, only an unsubstituted chemical material is intended to be included. For example, the phrase "alkyl group" is intended to include not only pure open-chain and cyclic saturated hydrocarbon alkyl substituents, such as methyl, ethyl, propyl, t-butyl, cyclohexyl, adamantyl, octadecyl, and the like, but also alkyl substituents bearing further substituents known in the art, such as hydroxyl, alkoxy, vinyl, phenyl, halogen atoms (F, Cl, Br, and I), cyano, nitro, amino, carboxyl, etc. On the other hand, the phrase "alkyl moiety" is limited to the inclusion of only pure open-chain and cyclic saturated hydrocarbon alkyl substituents, such as methyl, ethyl, propyl, t-butyl, cyclohexyl, adamantyl, octadecyl, and the like.

Other aspects of the present invention are apparent from the detailed description, the examples, and the claims.

DETAILED DESCRIPTION AND EXAMPLES

The Jeffamine® primary amine materials used in the present invention are low average molecular weight materials and are commercially available from Texaco Chemical Co. Two different types of Jeffamine® materials are used in the present invention: Jeffamine® ED-2001 [poly(propylene glycol-b-ethylene glycol-b-propylene glycol)bis(2-aminopropyl ether], weight average MW 2,000 (XIa) and Jeffamine® T-5000 [Glycerol tris(poly(propylene glycol), amine-terminated)ether], weight average MW 5,000, (XIb).

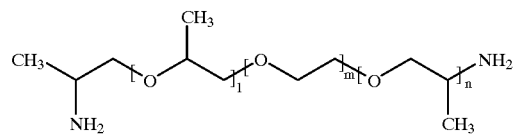

XIa: l = 2–3, m = 40, n = 2–3

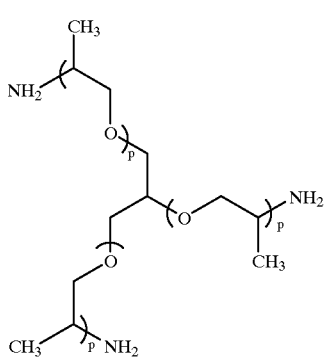

p = 16–23

The following examples illustrate the synthesis of the inventive mordants.

EXAMPLE 1

(a) To a solution of 5g Jeffamine® ED-2001 (XIa) in 20 g methanol was added a solution of the chloroacetone hydrazone (2.2 molar equiv.) of aminoguanidinium chloride in 10 mL methanol. The solution was heated to about 45° C. for 10–15 minutes. Mordant XIIa (where $X^-$ and $Y^-$ are $Cl^-$) was precipitated from ether as a semi-solid and dried in vacuum.

(b) The reaction in Example 1(a) was repeated using the chloroacetone hydrazone of aminoguanidinium trifluoroacetate and the product was isolated by the same procedure to obtain XIIa (where $X^-$ is trifluoroacetate and $Y^-$ is $Cl^-$).

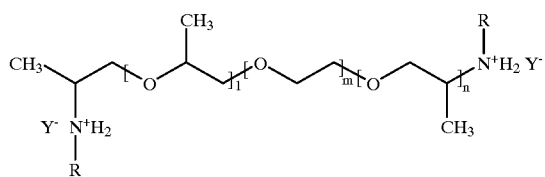

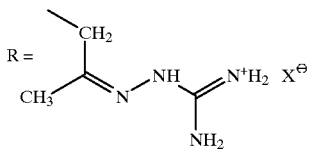

l = 2–3; m = 40; Q = —$CH_2$—, or —$CH_2$—$CH_2$—$CH_2$—;
$X^-$ = $Cl^-$ or trifluoroacetate

EXAMPLE 2

(a) The reaction in Example 1(a) was repeated using chloromethyl triphenylphosphonium bromide in place of the hydrazone to obtain the mordant XII(b!) wherein Q is —$CH_2$— and $Y^-$ is $Cl^-$.

(b) The reaction in Example 2(a) was repeated using bromopropyl triphenylphosphonium bromide in place of chloromethyl triphenylphosphonium bromide to obtain the mordant XII(b) where Q is —$CH_2CH_2CH_2$— and $Y^-$ is $Br^-$.

EXAMPLE 3

To a solution of 5 g of Jeffamine® T-5000 (XIb) in 20 g methanol was added a solution of the chloroacetone hydrazone (3.3 molar equiv.) of aminoguanidinium chloride in 10 mL methanol. The solution was heated to about 45–50° C. for 15 minutes to obtain the mordant XIII.

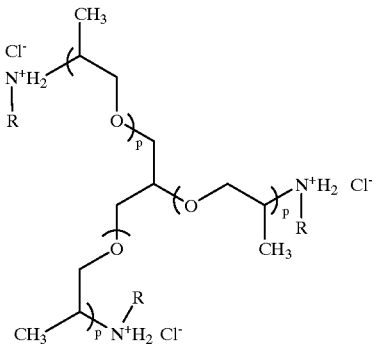

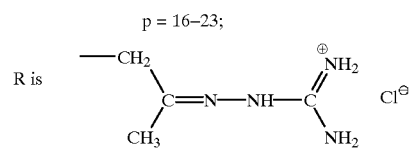

Reasonable modifications and variations are possible from the foregoing disclosure without departing from either the spirit or scope of the present invention as defined in the claims.

What is claimed is:

1. A mordant of the general formula:

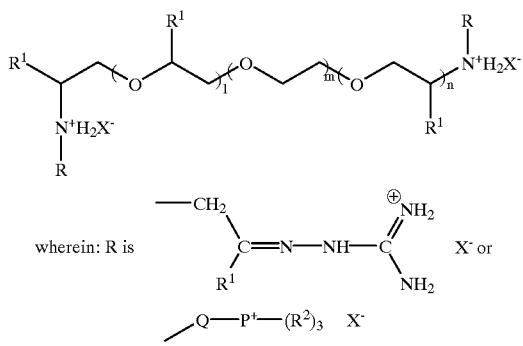

wherein: R is

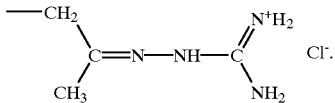

and: $R^1$ is an alkyl group of 1 to 6 carbon atoms, and $R^2$ is an alkyl, aryl, aralkyl, or alkaryl group of up to 10 carbon atoms inclusive; l and n are integers of 2 or greater; m is an integer of 5 or greater; and Q represents —$(CH_2)_y$— wherein y is 1–20; and each $X^-$ is independently an anion.

2. The mordant of claim 1 wherein $R^1$ is an alkyl group having 1 to 2 carbon atoms.

3. The mordant of claim 1 wherein $R^2$ is an alkyl group having up to 6 carbon atoms inclusive or phenyl.

4. The mordant according to claim 2 wherein l and n are 3 and m is 40.

5. The mordant according to claim 1 wherein $X^-$ is independently $CH_3SO_3^-$; $Br^-$; $NO_3^-$; $Cl^-$; $CF_3COO^-$;

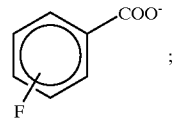

p-$MePhSO_3^-$; $ClO_4^-$; $F^-$; $CF_3SO_3^-$; $BF_4^-$; $C_4F_9SO_3^-$; $FSO_3^-$; $PF_6^-$; $ClSO_3^-$; or $SbF_6^-$.

6. The mordant of claim 3 wherein l and n are 2–3; m is 30–50; and y=3–4.

7. The mordant of claim 1 wherein:

R represents $$\text{—CH}_2\text{—C(CH}_3\text{)=N—NH—C(NH}_2\text{)=N}^+\text{H}_2 \quad Cl^-.$$

* * * * *